United States Patent [19]

Garberg et al.

[11] Patent Number: 6,164,285
[45] Date of Patent: Dec. 26, 2000

[54] POSITION-ADJUSTABLE CONTROL CONSOLE

[75] Inventors: Bryan J. Garberg, Moorhead, Minn.; Thomas G. Lykken; William B. Rodriguez, both of Fargo, N. Dak.

[73] Assignee: Case Corporation, Racine, Wis.

[21] Appl. No.: 09/039,263

[22] Filed: Mar. 16, 1998

[51] Int. Cl.[7] .................................................. B60K 26/00
[52] U.S. Cl. .......................... 130/326; 180/324; 294/115
[58] Field of Search .................................... 180/326, 334; 297/115, 116, 161, 162, 36, 353, 411.2, 411.23, 411.26, 411.31, 411.33, 411.34; 248/421, 284.1

[56] References Cited

U.S. PATENT DOCUMENTS

| | | | |
|---|---|---|---|
| 4,307,913 | 12/1981 | Spiegelhoff | 297/417 |
| 4,478,308 | 10/1984 | Klaassen | 180/326 |
| 4,499,963 | 2/1985 | Liston | 180/90.6 |
| 4,576,351 | 3/1986 | Brink | 248/118 |
| 4,580,647 | 4/1986 | Peifer et al. | 180/78 |
| 4,646,869 | 3/1987 | Kerner et al. | 180/334 |
| 4,691,888 | 9/1987 | Cotterill | 248/284 |
| 4,702,520 | 10/1987 | Whisker | 297/417 |
| 4,957,186 | 9/1990 | Reetz | 248/296 |
| 5,409,079 | 4/1995 | Strong et al. | 180/326 |
| 5,409,080 | 4/1995 | Templeton et al. | 180/326 |
| 5,566,778 | 10/1996 | Vailer et al. | 180/334 |
| 5,617,929 | 4/1997 | Richardson et al. | 180/326 |
| 5,887,669 | 3/1999 | Ostler et al. | 180/53.4 |
| 5,924,515 | 7/1999 | Stauffer | 180/326 |

*Primary Examiner*—J. J. Swann
*Assistant Examiner*—James S. McClellan
*Attorney, Agent, or Firm*—Jansson, Shupe, Bridge & Munger, Ltd.

[57] ABSTRACT

A control console for a mobile machine includes a lower support device, a first platform and a pair of links pivotally coupled between the support device and the first platform. A second platform is mounted atop the first platform for sliding movement parallel thereto and a compression mechanism coacts with the platforms and secures them in respective positions. More specifically, each platform includes a horizontal support member and a web extending downwardly from such members. The platform webs are closely proximate one another and when the compression mechanism is tightened, the webs and one of the links are compressed together. Web/link compression prevents up-down movement of the platforms in unison and also prevents movement of the second platform with respect to the first platform. A new method for moving the position of a control lever mounted on the console is also disclosed.

16 Claims, 7 Drawing Sheets

POSITION-ADJUSTABLE CONTROL CONSOLE

FIELD OF THE INVENTION

The invention relates generally to motor vehicles, and, more particularly, to motor vehicles with movable control stations.

BACKGROUND OF THE INVENTION

Many types of motor vehicles, e.g, passenger autos, includes controls which are fixed with respect to the vehicle structure. As to automobiles, the tilting steering wheel is an exception and, of course, the position of the driver's seat is adjustable in virtually any type of auto.

However, there are other types of motor vehicles (which may be referred to as "working" vehicles), in which the operator is frequently called upon to operate any of a number of control functions as well as to steer the vehicle and control its speed. Unlike an auto, the primary purpose of such a vehicle is to perform work rather than merely transport the operator from place to place. Examples of such working vehicles include industrial and construction equipment and agricultural tractors. A leading manufacturer of such vehicles is Case Corporation, Racine, Wis.

Because the operator of a working vehicle is required to manipulate control mechanisms (often over long periods of time) as well as drive the vehicle, it is important that the mechanisms be positioned for comfortable operation. Such a vehicle may be operated by any one of several persons, perhaps persons having widely disparate statures.

To provide optimum operating conditions for such persons, vehicle engineers have provided control consoles or mechanisms, the positions of which are adjustable in one way or another. For example, U.S. Pat. No. 4,478,308 (Klaassen) discloses a column for supporting a control lever used to operate a vehicle. By pulling upwardly on a T-shaped handle, a pin is moved to release the column for pivoting movement about a horizontal axis. By pulling horizontally on a locking pin, the column is released for vertical positioning movement. Other position-adjustable control consoles are disclosed in U.S. Pat. Nos. 4,499,963 (Liston); U.S. Pat. No. 4,580,647 (Peifer et al.); U.S. Pat. No. 4,702,520 (Whisler et al.); U.S. Pat. No. 4,646,869 (Kerner, Jr.); U.S. Pat. No. 5,409,079 (Strong, et al.) and U.S. Pat. No. 5,409,080 (Templeton et al.).

While these prior art consoles have been generally suited for their intended purpose, they are not without disadvantages. For example, in the console disclosed in the Klaassen patent, the operator must separately manipulate a handle and locking pin in order to change the horizontal and vertical positions, respectively, of the operator's control lever. And horizontal and vertical position adjustment is available in a series of discrete increments, not in a continuum.

Similarly, the armrest of the Whisler et al. patent requires manipulation of two separate devices to achieve all of the available position adjustment. And such position adjustment is, like those of the Klaassen console, available in discrete increments.

In the console disclosed in the Peifer et al. patent, the operator is unable to independently change the height or fore-and-aft position of such console. In other words, console position change involves changing both the console height and its fore-and-aft position.

The Templeton et al. patent discloses a pivoting operator's seat and a control console that can move along an arc-like path. While such patent states that console movement will "mimic" rotational movement of the operator's seat, there is nevertheless some change in relative position of seat and console. Thus, the control levers may not be in the same angular position relative to the seat for each seat/console position. It is believed that most operators would prefer a seat and console that pivot in unison.

And not all of the apparent disadvantages of the prior art relate to position adjustment. Serviceability is another consideration. As an example, there seems to be no convenient way to gain access to the underside of the control console disclosed in the Kerner, Jr. patent without at least partially dismantling such console.

An improved position-adjustable control console which addresses such disadvantages would be an important advance in the art.

OBJECTS OF THE INVENTION

It is an object of the invention to provide a new position-adjustable control console overcoming some of the problems and shortcomings of the prior art.

Another object of the invention is to provide a position-adjustable control console suitable for use in construction and agricultural vehicles.

Another object of the invention is to provide a position-adjustable control console which accommodates vehicle operators of widely-varying stature.

Yet another object of the invention is to provide a position-adjustable control console wherein both the height and the fore-and-aft position of the control mechanisms mounted thereon may be changed by manipulating a single device.

Another object of the invention is to provide a position-adjustable control console wherein, within certain travel limits, the height or the fore-and-aft position of the control mechanisms mounted thereon may be selected independently of one another.

Still another object of the invention is to provide a position-adjustable control console arrangement in which the seat and console pivot in unison.

Another object of the invention is to provide a position-adjustable control console which is easy to service. How these and other objects are accomplished will become apparent from the following descriptions and from the drawings.

SUMMARY OF THE INVENTION

The invention involves a control console for a mobile vehicle such as an off-road agricultural or construction machine. In general, the console includes a support device such as a bar or plate that attaches to or near the vehicle operator's seat. A first platform is above the support device and first and second links are pivotally coupled between the support device and such platform. In a highly preferred embodiment, there is also a third link pivotally coupled between the support device and the first platform.

A second platform is mounted atop the first platform for sliding movement parallel thereto. And a knob-adjusted compression mechanism coacts with the platforms and secures them in respective positions.

More specifically, the first link is pivotally coupled to the second platform and includes a slot. The compression mechanism includes a compression fastener having a square shoulder extending into the slot and movable therealong with slight clearance. (A carriage bolt is a highly suitable fastener.) The first link and its slot permit the first platform (as well as the second platform attached to it) to move horizontally and vertically while yet preventing the fastener from rotating with respect to the first link. Preventing fastener rotation (while yet permitting a rod threaded to the fastener to be rotated using an attached knob) permits the spacing between the fastener and rod to be changed to tighten or release the compression mechanism.

In another aspect of the invention, the fastener includes an enlarged compression head, also referred to as a first compression member, and the first and second platforms each includes a substantially horizontal support member and a web extending angularly therefrom, e.g., vertically downwardly therefrom. The webs are between the head and the rod (also referred to as a second compression member) and are compressed when the knob is tightened to urge the rod closer to the head, thereby exerting a compression force along a force axis coincident with the rod and head. In the vernacular, the webs are compressed by pinching them against one another so that the resulting frictional forces prevent web, and therefore platform, movement. The compression mechanism also has a tube fixed with respect to the first platform and the rod extends through the tube.

In a more specific embodiment, the first platform also includes a second web extending angularly therefrom. The second link is generally T-shaped and includes a tubular sleeve member at its first end, an attachment plate at its second end and a connecting bar extending between and rigidly affixed to the plate and the sleeve member. The sleeve member is between the first and second webs and the attachment plate is pivotally coupled to the support device.

While web compression is an acceptable way to prevent movement of the platforms, a preferred console also includes a redundant arrangement that further helps prevent movement of the second platform with respect to the first platform. The second platform has an elongate opening through it and the opening is angular with respect to the force axis of the compression mechanism. A platform fastener extends through the opening and interconnects the platforms. The platform fastener includes a jam bushing sized to move along the opening with slight sliding clearance. When the compression member is tightened, the second platform is urged somewhat sideways so that the edge of the elongate opening jams against the bushing, thereby providing another "friction point" which helps prevent movement of the second platform relative to the first.

In an exemplary application, the console is used in combination with a vehicle seat extending along a vertical seat plane and the above-mentioned support device is mounted with respect to such seat. The links mount the platforms for vertical movement in a continuum between elevated and lowered limits. That is, the platforms can be positioned anywhere between such limits; the console is not limited to platform positioning at discrete positions.

The second platform has a plurality of control levers mounted thereon along a lever axis. The elongate opening in the second platform extends along an opening axis parallel to the seat plane and the lever axis and the seat plane define a substantially constant angle therebetween, irrespective of the position of the platform between the elevated and lowered limits.

In side view, the console resembles a parallelogram and the links permit both the first and second platforms to translationally move between the elevated and lowered limits. And because of the platform fastener extending through the elongate opening in the second platform to interconnect the platforms, the second platform is permitted to translationally move with respect to the first platform. (During translation of a rigid body, every line in such body remains parallel to its initial position.)

Another aspect of the invention involves a new method for moving the position of a control lever mounted in a mobile machine. The method includes providing a lever-supporting console having a support device, a first platform, first and second links pivotally coupled between the support device and the first platform, a second platform mounted for movement with respect to the first platform and a compression mechanism coacting with the platforms. The compression mechanism is released, the first platform is moved from a first elevation to a second elevation and the compression mechanism is then tightened.

In more specific aspects, the moving step includes shifting the position of the second platform with respect to the first platform. And the releasing step increasing the dimension between the compression members.

Further details of the invention are set forth in the following detailed descriptions and in the drawings.

The terms "left" and "right" are from the perspective of a seated operator.

DETAILED DESCRIPTIONS OF PREFERRED EMBODIMENTS

Figure 1:
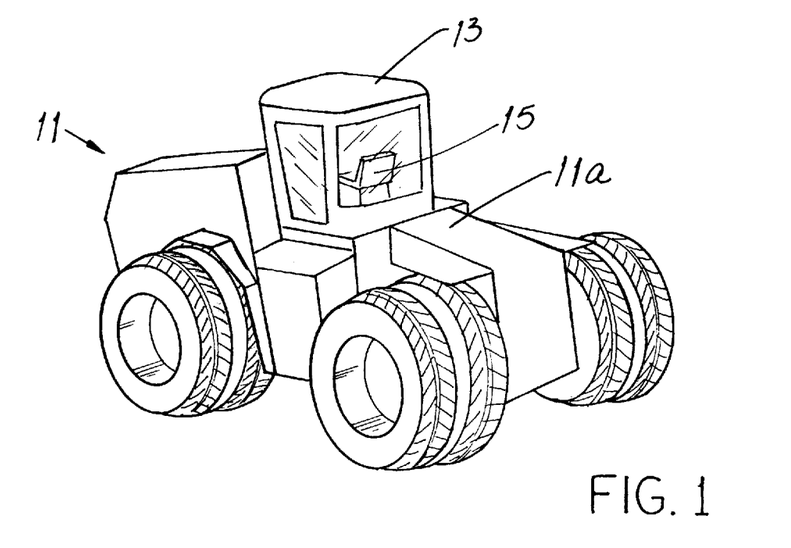
FIG. 1 is a perspective view of an exemplary machine, a large agricultural tractor, upon which the new console may be used.
Figure 2:
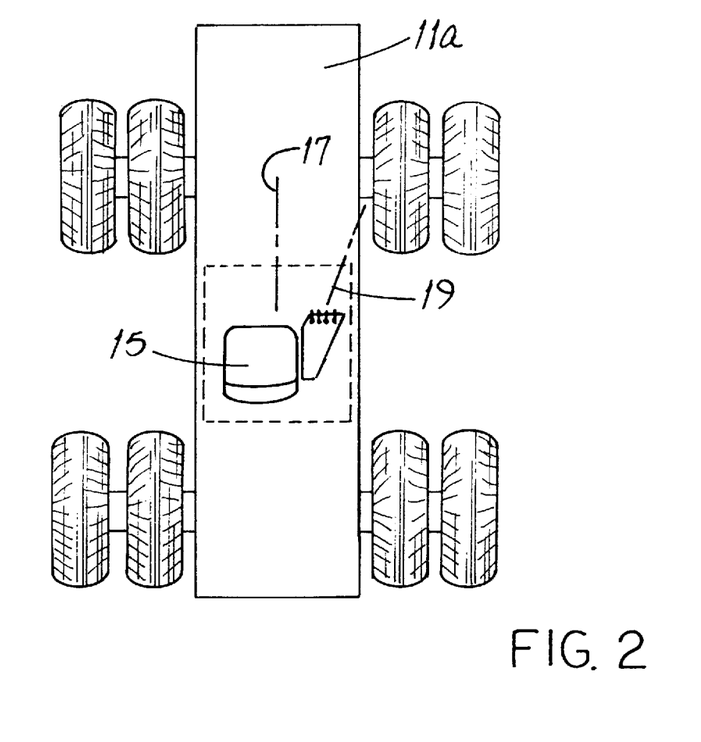
FIG. 2 is a representative top plan view of the tractor of FIG. 1. Surfaces of parts are shown in dashed outline.
Figure 3:
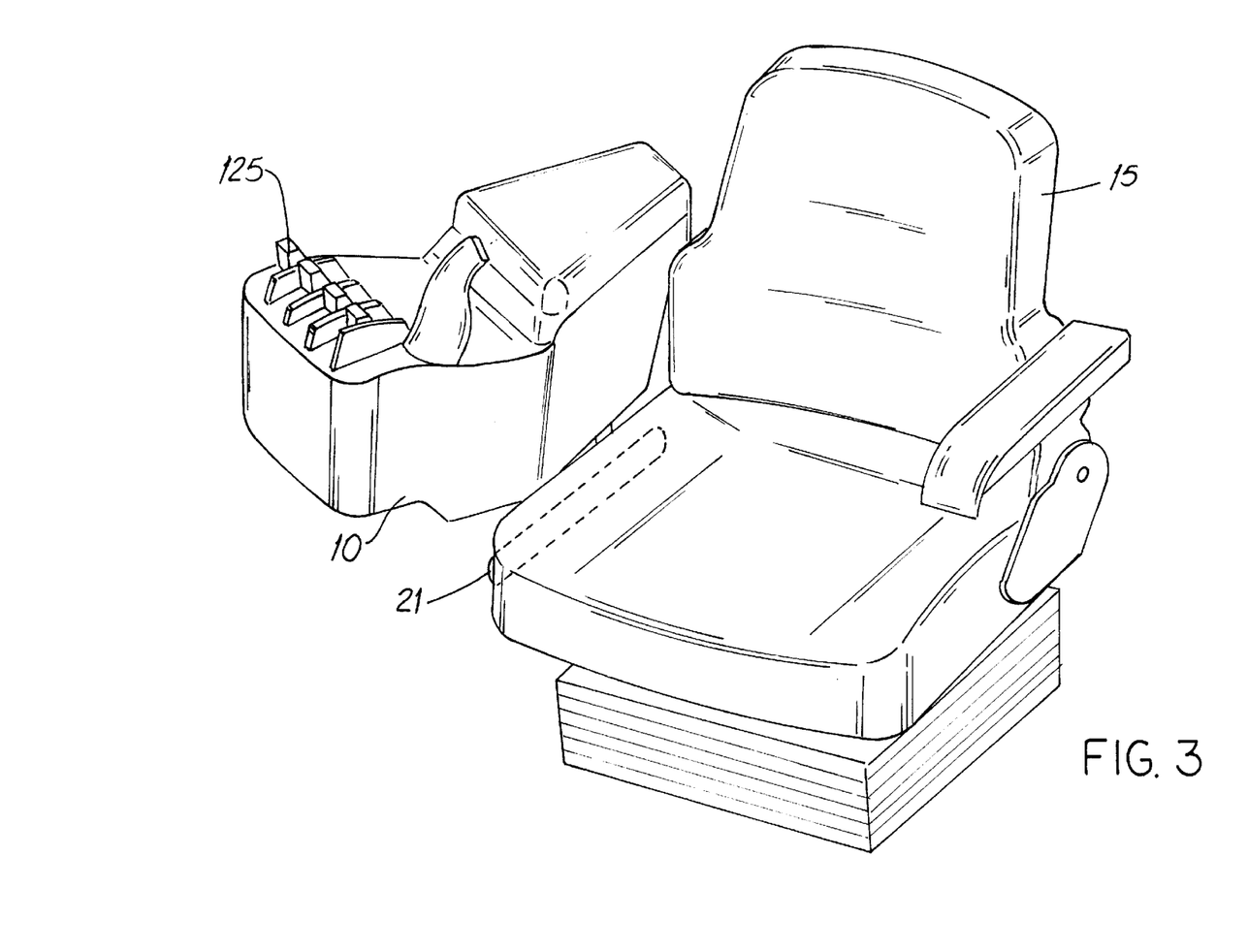
FIG. 3 is a perspective view of the console shown in connection with a seat as both would appear in finished form mounted in the tractor "ready for sale."
Figure 4:
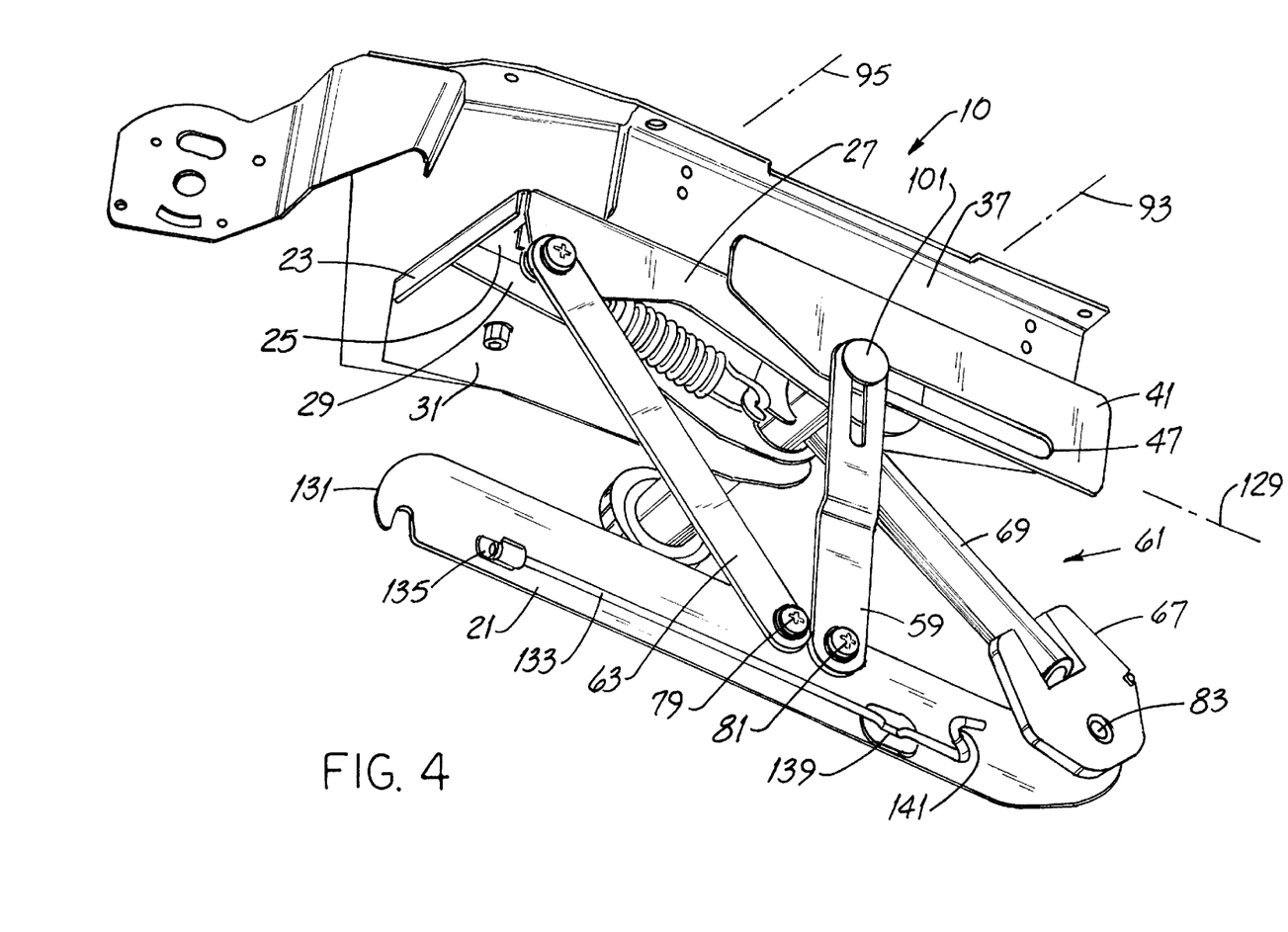
FIG. 4 is an upwardly-looking perspective view of the console from its left side.

Before describing the inventive console 10 and method, it will be helpful to have an understanding of an exemplary machine on which such console 10 and method may be used. Referring to FIGS. 1, 2 and 3, an exemplary machine 11 embodied as an agricultural tractor 11a includes a cab 13 and an operator's seat 15 in the cab 13 and oriented with respect to a vertical, fore-and-aft seat plane 17. The console 10 extends along an axis 19 which is angled with respect to the seat plane 17. FIG. 4 and following show detailed aspects of the console 10 relating to the invention.

Referring also to FIGS. 4, 5, 6, 7 and 8, the console 10 includes a support device 21 such as a bar or plate that attaches to or near the lower right side of the seat 15 and is generally horizontal when the console 10 is in use. A first platform 23 is above the support device 21 and includes a planar, generally horizontal first support member 25 having first, second and third webs 27, 29, 31, respectively, extending downwardly therefrom. The first and second webs 27, 29 are generally parallel to one another and to the plane 17. The third web 31 is angled with respect to the webs 27, 29 and all of the webs 27, 29, 31 are generally at right angles to the support member 21.

Figure 7:
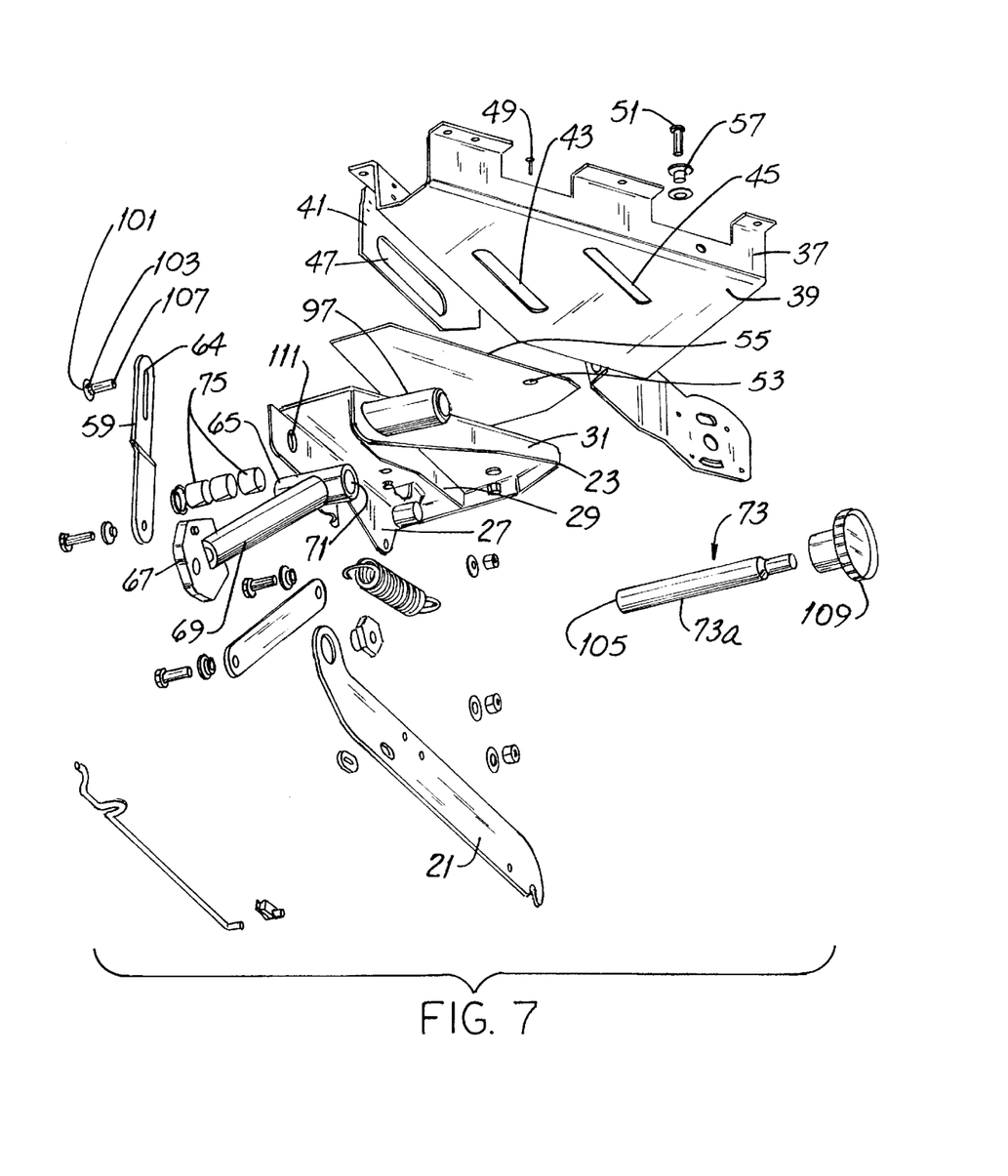
FIG. 7 is an exploded view of the console.
Figure 8:
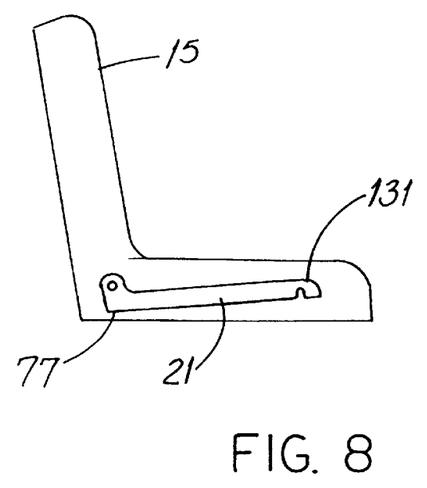
FIG. 8 is a representative side elevation view of the right side of the seat shown in FIG. 3.

A second platform 37 is supported atop the first platform 23 and includes a generally horizontal second support member 39 and a downwardly-extending web 41. The support member 39 includes a pair of horizontal, slot-like openings 43, 45 and the web 41 also includes a horizontally-oriented, elongate slot 47. In a highly preferred embodiment, the opening 43 has, as shown in FIG. 7, a width that is somewhat greater than that of the opening 45.

A pair of fasteners 49, 51 extend downwardly through the openings 43, 45 respectively, through respective apertures 53 in the spacer plate 55 between the members 39, 25 and into the support member 25. The fastener 51 extends through a jam bushing 57, the diameter of which is only slightly smaller than the width of the opening 45 so that the bushing 57 may slide along the opening 45 with slight clearance.

Figure 5:
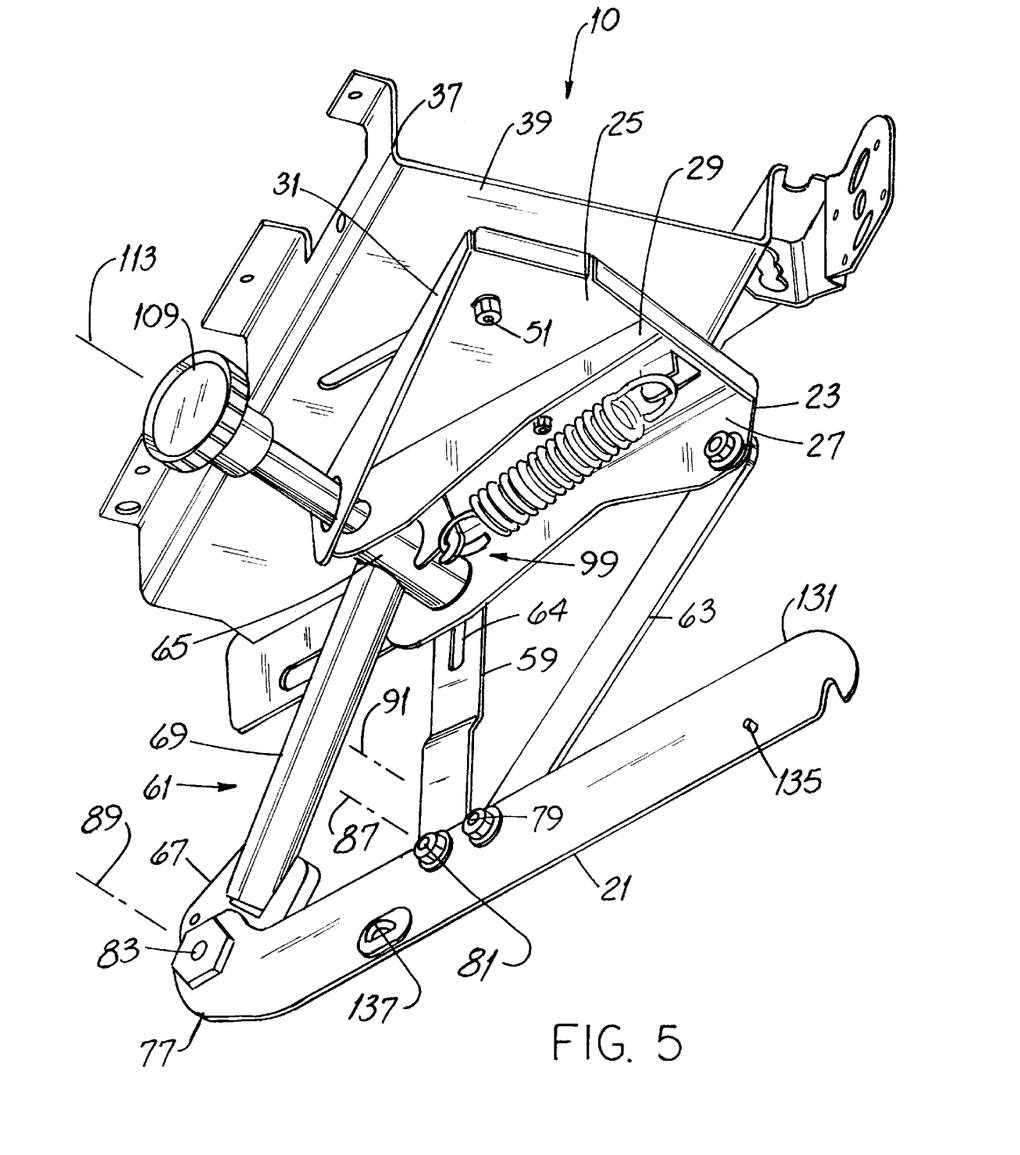
FIG. 5 is another upwardly-looking perspective view of the console looking generally toward its left rear.
Figure 6:
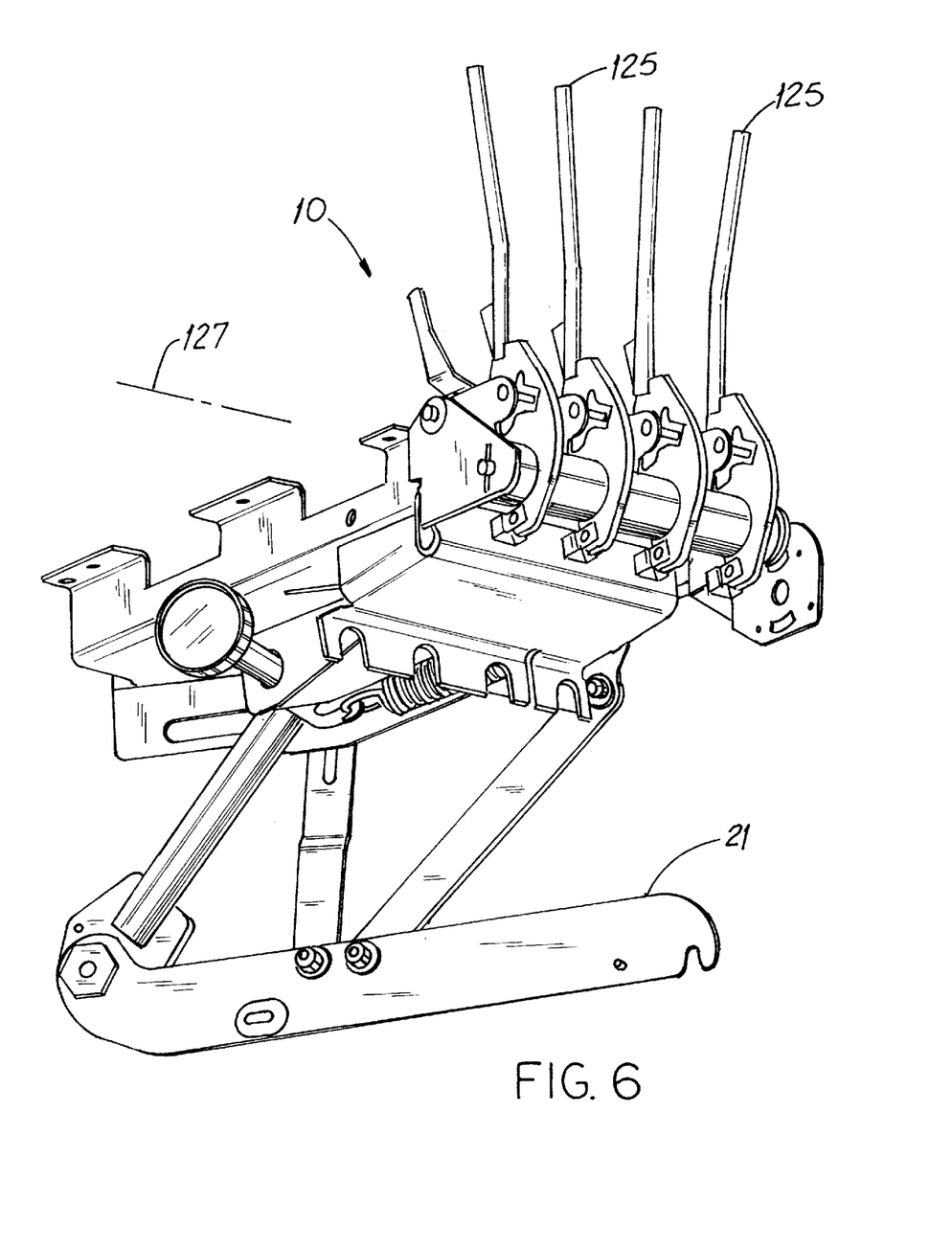
FIG. 6 is yet another upwardly-looking perspective view of the console looking generally toward its left rear.

The platforms 23, 37 are supported above the device 21 by first, second and third links 59, 61, 63, respectively. The first link 59 is pinned to the device 21 for pivoting movement with respect to such device 21 and includes an elongate slot 64 which, when the support platforms 23, 37 are positioned as shown in FIGS. 4, 5 and 6, is generally vertical.

The second link 61 is generally T-shaped and includes a tubular sleeve member 65 at its first end, an attachment plate 67 at its second end and a connecting bar 69 extending between and rigidly affixed to the plate 67 and the sleeve member 65. The sleeve member 65 is between the webs 27, 29 and has a hole 71 therethrough that is either sized to be only slightly greater than the diameter of the rod 73a (discussed in more detail below) or, more preferably, that is enlarged and fitted with bushings 75, the center holes of which are so sized.

The plate 67 is pivotally pinned to the rear end 77 of the device 21 while the third link 63 is pivotally pinned to the device 21 at a point 79 forward of the pivot points 81, 83 of the first and second links 59, 61, respectively. To put it in other words, the lower ends of the links 59, 61, 63 pivot about respective axes 87, 89, 91 which are spaced from one another. The upper end of the first link 59 and the sleeve member 65 of the second link 61 pivot with respect to a common axis 93 spaced from the pivot axis 95 of the upper end of the third link 63, the latter being attached to the web 27.

Referring particularly to FIGS. 4 and 7, a hollow guide tube 97 extends through the web 31 and is rigidly affixed to the webs 31, 29 preferably by welding. The console 10 includes a compression mechanism 99 comprising a first compression member 101, e.g., the enlarged head of a carriage bolt. The square bolt shoulder 103 extends into the slot 64 and moves therealong with slight clearance when the height of the platform 23, 37 are being adjusted. And, notably, because there is only slight clearance between the shoulder 103 and the slot 64, the shoulder 103 (and thus the member 101) are prevented from rotating.

The compression mechanism 99 also includes a second compression member 73, e.g., the rod 73a, the end 105 of which is threaded to the bolt shank 107. An adjusting knob 109 is affixed to the rod 73a for rod rotation during console position adjustment. The diameter of the rod 73a is greater than that of the hole 111 so that the rod shoulder bears against that portion of the web 27 around the hole 111. Positionally, the upper end of the link 59, the web 41 and the web 27 are between the bolt head 101 and the rod end 105.

From the foregoing, it is now apparent that when the rod 73a is rotated to advance toward the bolt shoulder 103, the link 59 and the webs 27, 41 are compressed between the bolt head 101 and the rod 73a. When the knob 109 is rotated to move the bolt head 101 and the rod 73a toward one another, the webs 27, 41 and the link 59 are compressed together with sufficient force along the force axis 113 that the friction between the webs 27, 41 and the link 59 is quite high. Therefore, the first platform 23 is held in a fixed position with respect to the device 21 and the second platform 37 is held in a fixed position with respect to the first platform 23.

While web compression is an acceptable way to prevent movement of the platforms 23, 37, a preferred console 10 also includes a redundant arrangement that further helps prevent movement of the second platform 37 with respect to the first platform 23. When the compression member 99 is tightened, the second platform 37 is urged somewhat sideways so that the edge of the elongate opening 45 jams against the bushing 57, thereby providing another friction point which helps prevent movement of the second platform 37 relative to the first platform 23.

Figure 9:
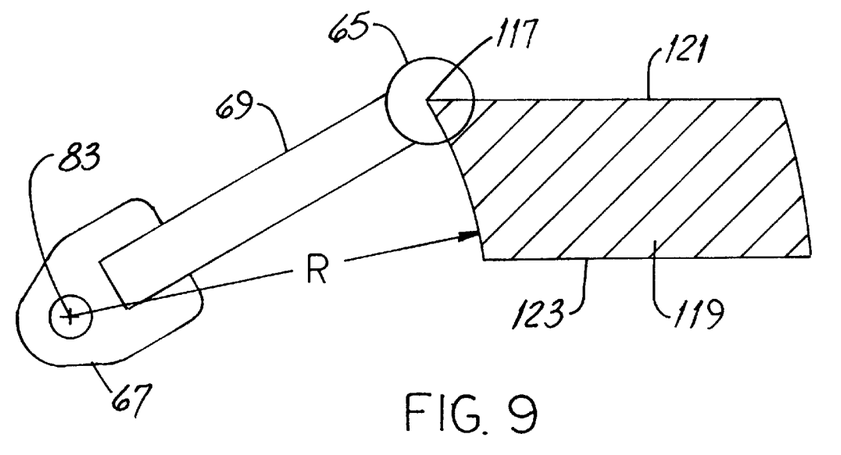
FIG. 9 is a diagram illustrating the area in which the console first platform (having the control levers mounted thereon) is capable of being moved for optimum lever position with respect to a particular operator.

Referring also to FIG. 9, any point on the first platform 23 is capable of moving in an arc, the radius R of which is equal to the distance between the point 117 and the pivot point 83. And because of the second platform 37 and its support member 39 are capable of moving parallel to the support member 25 of the first platform 23, any point on the second platform 37 is capable of moving anywhere within a generally parallelogram-shaped area 119. And movement of the first and second platforms 23, 37 is in a continuum between the elevated and lowered limits 121, 123, respectively.

Referring particularly to FIGS. 2, 3, 4, 5 and 6, in an exemplary application, the second platform 37 has a plurality of control levers 125 mounted thereon along a lever axis 127. The elongate slot 47 in the second platform 37 extends along a slot axis 129 parallel to the seat plane 17 and the lever axis 127 and the seat plane 17 define a substantially constant angle therebetween, irrespective of the position of the platform 37 between the elevated and lowered limits 121, 123. Movement of the platforms 23, 37 is translational; that is, there is no rotation of either platform 23, 37 about any axis during platform movement in normal operation.

Another aspect of the invention involves a new method for moving the position of a control lever 125 mounted in a mobile machine 11. The method includes providing a lever-supporting console 10 having the support device 21, the first platform 23, first and second links 59, 61 pivotally coupled between the support device 21 and the first platform 23, the second platform 37 mounted for movement with respect to the first platform 23 and the compression mechanism 99 coacting with the platforms 23, 37. The compression mechanism 99 is released, the first platform 23 is moved from a first elevation to a second elevation and the compression mechanism 99 is then tightened.

In more specific aspects, the moving step includes shifting the position of the second platform 37 with respect to the first platform 23. And the releasing step includes increasing the dimension between the compression members 73, 101.

The new console 10 is configured with ease of service in mind. While the rear end 77 of the device 21 is preferably fixed with respect to the seat 15, the front end 131 can be pivoted upwardly with respect to the seat 15. A prop rod 133 has one end 135 pivotally attached to the device 21 and includes a retention portion 137 extending through an aperture 139 in the device 21. When the front end 131 is pivoted upwardly, the retention portion 137 is withdrawn from the aperture 139 and the rod 133 swung downwardly about the end 135. The support notch 141 is positioned to engage a support pin (not shown) for holding the console 10 in an elevated position.

While the principles of the invention have been shown and described in connection with preferred embodiments, it is to be understood clearly that such embodiments are by way of example and are not limiting.

What is claimed:

1. A control console for a mobile machine including:
   a support device;
   a first platform;
   first and second links pivotally coupled between the support device and the first platform;
   a second platform mounted for movement with respect to the first platform;
   a third link pivotably coupled between the first and second platforms and the support device so as to allow slidable movement of the second platform with respect to the first platform; and
   a compression mechanism coacting with the platforms and securing the platforms in respective positions.

2. The console of claim 1 wherein:
   the second platform includes an elongate opening therethrough;
   the compression mechanism exerts a compression force along a force axis; and
   the opening is angular with respect to the axis.

3. The console of claim 1 wherein the links permit the first platform to translationally move between elevated and lowered limits.

4. The console of claim 1 wherein the links permit the second platform to translationally move between elevated and lowered limits.

5. The console of claim 2 wherein:
   a fastener extends through the opening and interconnects the platforms; and
   the fastener includes a jam bushing sized to move along the opening with slight sliding clearance.

6. The console of claim 4 wherein:
   the second platform includes an elongate opening;
   a fastener extends through the opening and interconnects the platforms, thereby permitting the second platform to translationally move with respect to the first platform.

7. A method for moving the position of a control lever mounted in a mobile machine and including:
   providing a lever-supporting console having a support device, a first platform, first and second links pivotally coupled between the support device and the first platform, a second platform mounted for movement with respect to the first platform a third link pivotably coupled between the support device and the first and second platforms and a compression mechanism coacting with the platforms;
   releasing the compression mechanism;
   moving the first platform from a first elevation to a second elevation; and
   tightening the compression mechanism.

8. The method of claim 7 wherein the moving step includes shifting the position of the second platform with respect to the first platform.

9. A control console for a mobile machine including:
   a support device;
   a first platform;
   first and second links pivotally coupled between the support device and the first platform;
   a second platform mounted for movement with respect to the first platform;
   a compression mechanism coacting with the platforms and securing the platforms in respective positions;
   wherein:
   the first link is pivotally coupled to the second platform and includes a slot; and
   the compression mechanism includes a fastener having a shoulder extending into the slot and movable therealong with slight clearance, the fastener thereby being prevented from rotating with respect to the first link.

10. The console of claim 9 wherein:
    the fastener includes a compression head;
    the compression mechanism includes a rod threaded to the fastener;
    the first and second platforms each includes a substantially horizontal support member and a web extending angularly therefrom; and
    the webs are between the head and the rod, thereby permitting the webs to be releasably compressed.

11. The console of claim 10 wherein the compression mechanism includes a tube fixed with respect to the first platform and wherein:
    the rod extends through the tube; and
    an adjustment knob is affixed to the rod for rod rotation, thereby compressing and releasing the webs.

12. A control console for a mobile machine including:
    a support device;
    a first platform;
    first and second links pivotally coupled between the support device and the first platform;
    a second platform mounted for movement with respect to the first platform;
    a compression mechanism coacting with the platforms and securing the platforms in respective positions;
    wherein:
    the first platform includes a substantially horizontal support member and first and second webs extending angularly therefrom; and
    the second link includes a sleeve member between the first and second webs.

13. The console of claim 12 wherein:
    the second link includes first and second ends;
    the sleeve member is at the first end; and
    the second end is pivotally coupled to the support device.

14. The console of claim 13 including a third link pivotally coupled between the support device and the first platform.

15. A control console for a mobile machine in combination with a seat extending along a vertical seat plane including:
    a support device;
    a first platform;
    first and second links pivotally coupled between the support device and the first platform;
    a second platform mounted for movement with respect to the first platform;

a compression mechanism coacting with the platforms and securing the platforms in respective positions;

wherein:

the second platform includes an elongate opening therethrough;

the compression mechanism exerts a compression force along a force axis;

the opening is angular with respect to the axis;

the links mount the platforms for vertical movement in a continuum between elevated and lowered limits;

the support device is mounted with respect to the seat;

the second platform has a plurality of control levers mounted thereon along a lever axis; and the lever axis and the seat plane define a substantially constant angle therebetween, irrespective of the position of the platform between the limits.

16. A method for moving the position of a control lever mounted in a mobile machine and including:

providing a lever-supporting console having a support device, a first platform, first and second links pivotally coupled between the support device and the first platform, a second platform mounted for movement with respect to the first platform and a compression mechanism coacting with the platforms;

releasing the compression mechanism;

moving the first platform from a first elevation to a second elevation; and tightening the compression mechanism;

wherein:

the compression mechanism includes first and second compression members;

each platform includes a web between the members; and wherein:

the releasing step increasing the dimension between the compression members.

* * * * *